United States Patent [19]

Fujieda

[11] Patent Number: 4,940,122
[45] Date of Patent: Jul. 10, 1990

[54] SLIP CONTROL SYSTEM FOR TORQUE CONVERTER OF AUTOMATIC TRANSMISSION

[75] Inventor: Fusao Fujieda, Hatsukaichi, Japan

[73] Assignee: Mazda Motor Corporation, Hiroshima, Japan

[21] Appl. No.: 310,333

[22] Filed: Feb. 14, 1989

[30] Foreign Application Priority Data

Feb. 15, 1988 [JP] Japan .................. 63-32500

[51] Int. Cl.$^5$ ............................ B60K 41/16
[52] U.S. Cl. ................. 192/3.31; 192/0.032; 192/0.096; 192/3.3
[58] Field of Search ............ 192/3.31, 3.3, 0.032, 192/0.096, 3.29, 0.076, 3.58, 3.61

[56] References Cited

U.S. PATENT DOCUMENTS

| | | | |
|---|---|---|---|
| 4,468,988 | 9/1984 | Hiramatsu | 74/868 |
| 4,580,671 | 4/1986 | Matsuoka et al. | 192/0.076 |
| 4,618,041 | 10/1986 | Sotoyama et al. | 192/0.044 |
| 4,640,394 | 2/1987 | Higashi et al. | 192/3.31 |
| 4,669,441 | 6/1987 | Okimoto | 123/559 |
| 4,687,083 | 8/1987 | Sotoyama et al. | 192/0.076 |
| 4,766,544 | 8/1988 | Kurihara et al. | 192/0.032 |

FOREIGN PATENT DOCUMENTS

57-33253 2/1982 Japan .

Primary Examiner—Rodney H. Bonck
Assistant Examiner—Andrea Pitts
Attorney, Agent, or Firm—Fleit, Jacobson, Cohn, Price, Holman & Stern

[57] ABSTRACT

A slip control system of a lock-up clutch of an automatic transmission comprising a torque converter, lock-up clutch, slip control device for controlling an engaging force of the lock-up clutch to establish a slip control in which a predetermined rotation speed difference is allowed between the input member and output member when a vehicle operating condition is in a predetermined slip control zone, transient control device for carrying out a transient control by setting a transient control factor to increase a change in the engaging force of the lock-up clutch for a transient condition when the vehicle operating condition is transferred from a non-slip control zone to the slip control zone, and the transient control factor being determined in accordance with a vehicle operating condition just before the vehicle operating condition falls into the slip control zone. The slip control system reduces a torque shock in a change between the non-slip control condition and the slip control condition and at the same time accomplishes a responsive slip control.

13 Claims, 8 Drawing Sheets

SLIP CONTROL SYSTEM FOR TORQUE CONVERTER OF AUTOMATIC TRANSMISSION

CROSS-REFERENCE TO THE RELATED APPLICATION

This application relates to U.S. Pat. applications Ser. Nos. 242,282 filed on Sept. 8, 1988 entitled "TORQUE CONVERTER SLIP CONTROL DEVICE", 250,603 filed on Sept. 29, 1988 by Fumiaki Baba et al entitled "LOCK-UP CONTROL SYSTEM FOR AUTOMATIC TRANSMISSION", and 293,689 filed on Jan. 12, 1989 entitled "SLIP CONTROL SYSTEM FOR LOCK-UP CLUTCH oF AUTOMATIC TRANSMISSION", which are assigned to the same assignee as the present invention.

BACKGROUND OF THE INVENTION

1. Field of the invention

The present invention relates to a torque converter for an automatic transmission having a lock-up clutch, more specifically to a slip control system for the lock-up clutch.

2. Description of the Prior art

In a field of a torque converter incorporated to an automatic transmission of an automotive vehicle, there has been proposed a lock-up clutch for providing a direct connection between engine output member and input member of the transmission under a predetermined vehicle operating condition wherein there occurs no amplification of a torque, or no change in torque from an engine so that a fuel consumption performance of the vehicle is improved.

When the lock-up clutch is engaged, the torque from the engine is transmitted bypassing the torque converter to the transmission through the lock-up clutch. Under this operation, it is advantageous in that the fuel consumption performance can be improved because there is no energy loss caused by a fluid friction in the torque converter. On the other hand, it is disadvantageous in that the torque amplification and a shock absorbing function of the torque converter cannot be obtained to thereby deteriorate a riding comfort.

In view of the above characteristics of lock-up clutch of the torque converter, there has been proposed a slip control for the lock-up clutch wherein the lock-up clutch is controlled to produce a certain slippage of the lock-up clutch or a rotation speed difference between an input and output members of the toque converter to avoid the above disadvantage.

Japanese Patent Public Disclosure No. 57-33253 (corresponding to U.S. Pat. No. 4,468,988 issued on Sept. 4, 1984) laid open to the public in 1982, discloses a slip control system for a lock-up clutch of a torque converter wherein respective rotation speeds of an input and output members of the torque converter are detected and a hydraulic pressure for controlling the lock-up clutch is controlled for converging a rotation speed difference between the input and output members to a predetermined value by means of a feedback control. U.S. Pat. Nos. 4,580,671, 4,618,041, 4,669,441, 4,687,083 disclose conventional transmission control systems respectively.

In the slip control of the lock-up clutch, an engaging force of the lock-up clutch or the amount of the slippage thereof is usually determined based on the vehicle operating condition, such as an engine load, an engine speed, and/or a vehicle speed.

In the automatic transmission provided with the slip control system for the torque converter, when an operation of the transmission changes from a non-slip control condition wherein the engaging force of the lock-up clutch is controlled not to allow the slippage thereof substantially (a lock-up control condition) or no engaging force is exerted in the lock-up clutch, that is, the lock-up clutch is fully disengaged (a converter control condition ) to a slip control condition wherein the engaging force of the lock-up clutch is controlled to allow a certain slippage of the lock-up clutch, there produces a certain torque shock undesirably. The torque shock may also occurs when a change in the control for the lock-up clutch between the lock-up control condition and the converter control condition.

In order to reduce the torque shock in a transient condition from the non-slip control condition to the slip control condition, when the transient condition occurs in the case where the control for the lock-up clutch is changed from the converter control condition to the slip control condition or to the lock-up control condition through the slip control condition, the engaging force of the lock-up clutch is usually controlled at a value which provides a relatively large slippage of the lock-up clutch at a first stage and then is controlled to be decreased gradually toward a target value (including a value of no slippage). On the other hand, when the transient condition occurs in the case where the lock-up control condition is transferred to the slip control condition or to the converter control condition through the slip control condition, the engaging force is set at a smaller value than the final target value and is increased gradually toward the target value (including the converter control condition).

It should however be noted that the torque shock caused by the change from the non-slip control condition to the slip control condition depends on the vehicle operating condition just before the slip control condition is initiated. Therefore, even through the engaging force of the lock-up clutch is commonly controlled to ease the torque shock for the respective transient conditions, there might occur a problem that the torque shock cannot be removed effectively in some vehicle operating conditions at the time of a transition between the non-slip control condition and the slip control condition.

A longer period transient control would be effective for easing the torque shock.

However, it is impossible for the control to accomplish a responsive slip control.

SUMMARY OF THE INVENTION

It is therefore an object of the present invention to provide a slip control system which is responsive to a change in a vehicle operating condition.

It is another object of the present invention to provide a slip control system which can ease a torque shock caused by a change between a slip control condition and a non-slip control condition in a lock-up clutch of automatic transmission effectively.

It is still another object of the present invention to provide a slip control system which can ease the torque shock irrespective of a vehicle operating condition before the change in the control for an engaging force of the lock-up clutch.

The above and other objects of the present invention can be accomplished by a slip control system of a lock-up clutch of an automatic transmission comprising a torque converter disposed between the engine and the automatic transmission for controlling an amount of a torque transmitted from the engine to the transmission, lock-up clutch means provided in the torque converter for connecting an input and output members of the torque converter directly, slip control means for controlling an engaging force of the lock-up clutch means to establish a slip control in which a predetermined rotation speed difference is allowed between the input member and output member when a vehicle operating condition is in a predetermined slip control zone, transient control means for carrying out a transient control by setting a transient control factor to increase a change in the engaging force of the lock-up clutch means for a predetermined time period when the vehicle operating condition is transferred from a non-slip control zone wherein the lock-up clutch is fully engaged or fully disengaged to said slip control zone, and the transient control factor being determined in accordance with a vehicle operating condition just before said engine operating condition falls into said slip control zone.

In a preferred embodiment of the present invention, when a vehicle speed is increased to initiate the slip control as a change in the engine operating condition, the transient control factor for increasing a change in the engaging force of the lock-up clutch is determined at a value smaller than that in the case where an engine load is reduced to initiate the slip control.

Alternatively, when the vehicle speed is reduced to initiate the slip control, the transient control factor is determined at a value smaller than that in the case where the engine load is reduced to initiate the slip control.

When the vehicle speed is reduced to initiate the slip control, the transient control factor is determined at a value smaller than that in the case where the vehicle speed is increased to initiate the slip control.

When the vehicle speed is increased to initiate &:he slip control, the transient control factor is determined at a value greater than that in the case where the vehicle speed is reduced to initiate the slip control and smaller than that in the case where the engine load is reduced to initiate the slip control.

According to the slip control of the present invention, the slip control is carried out in a predetermined engine operating zone which is defined by the engine load, engine speed and/or the vehicle speed and the like. In starting the slip control, the engaging force of the lock-up clutch is controlled so as to ease or absorb the torque shock caused by a change in the non-slip control and the slip control of the lock-up clutch. When the slip control is established from a lock-up condition in which the lock-up clutch is fully engaged not to allow a substantial rotation difference between the input and output members of the torque converter or slippage in the lock-up clutch, the engaging force is controlled to provide a smaller slippage in the lock-up clutch than a target value at a initial stage of the transient condition then to be increased gradually toward the target value. When the slip control is established from a converter control condition wherein the lock-up clutch is fully disengaged, the engaging force is controlled to a value larger than a target value at the first stage and then is reduced gradually toward the target value.

In this case, the torque shock depends on the engine operating condition just before the slip control of the lock-up clutch means is initiated.

In the case where the engine load is reduced so that the engine operating condition falls into the predetermined engine operating condition and thus the control of the lock-up clutch is transferred from the converter control condition to the slip control or the lock-up control condition, the torque shock caused by the change of the control for the lock-up clutch is relatively hard. On the other hand, when the slip control is initiated because of a reduction of the vehicle speed, the torque shock is relatively small. Further, when the vehicle speed is increased so that the slip control is initialized, the torque shock is intermediate between them.

In view of the above, when the relatively great torque shock is caused by the change of the control based on for example, a reduction of the engine load, the transient control factor for the slip control is set at a relatively small value to ease the torque shock. On the other hand, when the relatively small torque shock is caused by the change of the control based on for example, a reduction of the engine load, the transient control factor for the slip control is set at a relatively great value to finish the transient control condition as soon as possible.

According to one of a preferred embodiment of the present invention, the transient control is carried out by means of a feedforward control in which the engaging force of the lock-up clutch means is changed in accordance with a predetermined control property, thereafter a feedback control is initiated after a completion of the transient control in a manner that the engaging force of the lock-up clutch means is controlled to allow the predetermined speed difference (for example 80 rpm) between the input and output members of the torque converter.

It will be understood that the target value of the slippage of the slip control can be widely changed so that the present invention can be substantially applied for transient controls between the converter control condition and the lock-up control condition.

The above and other features of the present invention will be apparent from the following description taking reference to the accompanying drawings

DESCRIPTION OF THE PREFERRED EMBODIMENT

Figure 1:
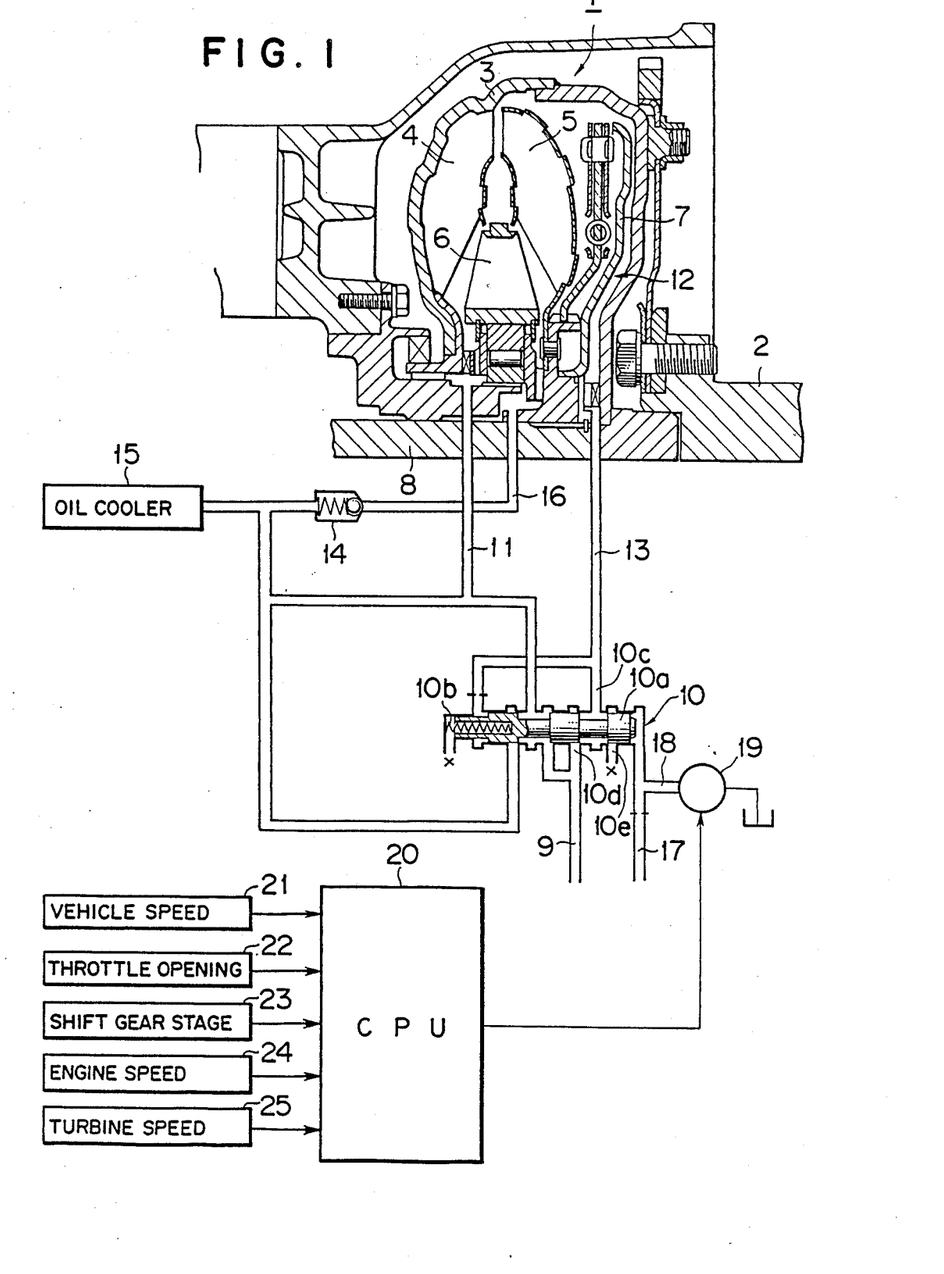
FIG. 1 is a sectional view showing a torque converter and a hydraulic circuit.

Referring to the drawings, specifically to FIG. 1, a torque converter 1 is provided with a pump 4 mounted on one side of a case 3 fixed to an engine output shaft 2 for rotating together with the shaft 2, a turbine 5 facing the pump 4 and rotatably mounted on the other side of the case 3 for being driven by the pump 4 through a hydraulic oil, and a stator 6 disposed between the pump 4 and the turbine 5 for amplifying the torque when a speed ratio of the turbine 5 to the pump 4 is smaller than a predetermined value. The torque converter 1 is provided with a lock-up clutch 7 for directly connecting the engine output shaft 2 or an input member of the torque converter 1 and a turbine shaft 8 or an output member of the torque converter 1. The rotation of the turbine 5 is transmitted to a shift gear mechanism of an automatic transmission (not shown) through the turbine shaft 8. When the lock-up clutch 7 connected with the turbine shaft 8 is engaged with the case 3, the turbine shaft 8 is directly or rigidly connected with the engine output shaft 2 through the case 3 and the lock-up clutch 7.

A hydraulic pressure of the hydraulic oil is introduced into the torque converter 1 from an oil pump (not shown) through a main line 9, a lock-up valve 10 and a converter-in line 11 so that a hydraulic pressure urges the lock-up clutch 7 to be brought into engagement. The clutch 7 and the case 3 defines an oil chamber 12 with which the lock-up valve 10 is communicated through a lock-up release line 13. When the hydraulic pressure is introduced into the chamber 12, the lock-up clutch 7 is disengaged from the case 3. The torque converter 1 is connected with a converter-out line 16 for introducing the hydraulic oil to an oil cooler 15 through a check valve 14 which keeps a predetermined hydraulic pressure in the chamber 12.

The lock-up valve 10 is provided with a spool 10a and a spring 10b for urging the spool 10a to the right in FIG. 1 and formed with a port 10c connected with the lock-up release line 13, a pressure regulating port 10d located at one side of the port 10c and connected with the main line 9 and a drain port 10e located at the other side of the port 10c. To the right end of the lock-up valve 10 in FIG. 1 is connected a control line 17 for introducing a pilot hydraulic pressure to the spool 10a. There is provided a duty solenoid valve 19 on a drain line 18 which is separated from the control line 17. The solenoid valve 19 controls an opening of the drain line 18 continuously in accordance with a signal of a duty ratio to thereby control the pilot pressure in the control line 17 to a value corresponding to the duty ratio. The pilot pressure is applied to the spool 10a of the lock-up valve 10 against a resilient force of the spring 10b. The spool 10a is also subjected to a hydraulic pressure from the lock-up release line 13 in the same direction as the resilient force of the spring 10b. Thus, the spool 10a moves in accordance with a sum of the resilient and hydraulic forces acting thereon so that the lock-up release line 13 is communicated with the drain port 10e or the main line 9 through the pressure regulating port 10d. As the duty ratio of the signal introduced in the solenoid valve 19 is increased, namely ON-time of one ON-OFF cycle is increased, the quantity of the hydraulic oil for draining through the control line 17 is decreased so that the pilot pressure or the pressure in the release line 13 is increased. As a result, the lock-up clutch is urged to be released. The maximum value of the duty ratio ( ON time/ ON time and OFF time in one cycle is substantially 100%) causes an entire disengagement of the lock-up clutch 7 resulting in no torque transmitting through the clutch 7. This means all the engine torque is transmitted through the toque converter 1. On the contrary, as the duty ratio is decreased, the quantity of the draining is increased to cause a reduction of the pilot pressure so that the lock-up clutch 7 is controlled to be engaged. Eventually, the minimum value of the duty ratio (substantially 0%) establishes a full engagement of the lock-up clutch 7. This means all the engine torque is transmitted to the transmission gear mechanism 4 through the lock-up clutch 7. When the duty ratio takes a value between the maximum and the minimum values, the lock-up clutch 7 produces a certain amount of slippage in an engaging surface between the lock-up clutch 7 and the case 3. An engaging force of the lock-up clutch 7 is changed in accordance with the duty ratio as a result of the hydraulic pressure in the chamber 12 is changed according to the duty ratio so that an amount of the slippage can be controlled in accordance with the duty ratio.

Hereinafter, there is described a hydraulic control system of the automatic transmission including the lock-up clutch 7 and a fuel supply system.

The control system comprises a control unit 10 which receives signals from a vehicle speed sensor 21 for detecting a vehicle speed, a throttle sensor 22 for detecting a throttle opening $\Theta$, a shift gear stage sensor 23 for detecting a gear stage of the transmission currently selected, an engine speed sensor 24 for detecting an engine speed, a turbine speed sensor 25 for detecting a turbine speed.

Figure 2:
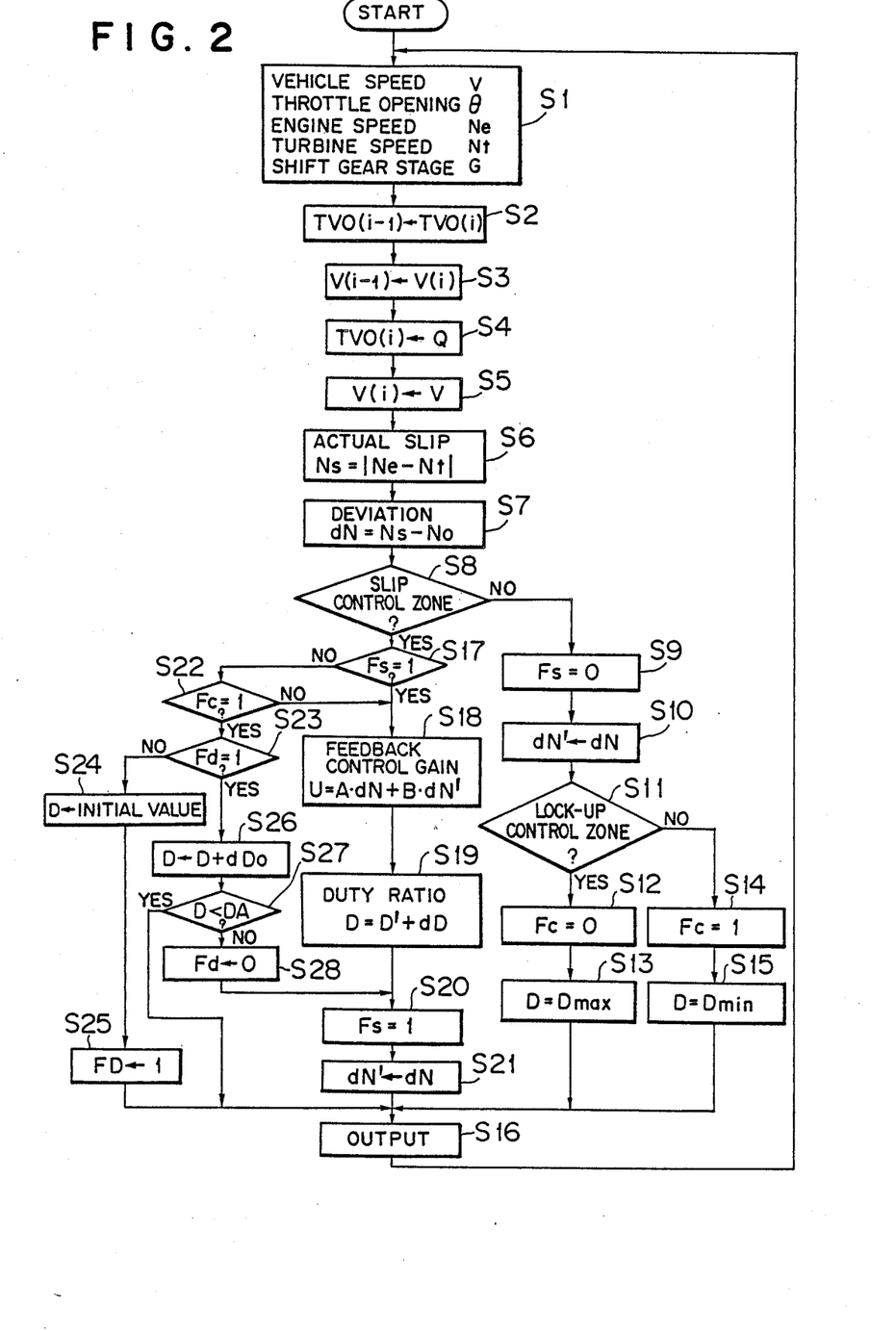
FIG. 2 is a flow chart of a lock-up control.

The control unit 20 calculates the duty ratio of the duty solenoid valve 19 based on the signals from the sensors 21–25 to controls the engaging force of the lock-up clutch 7 of the torque converter 1 in accordance with a control shown as a flow chart in FIG. 2.

In the control, as shown in FIG. 2, the control unit 20 receives signals denoting a vehicle speed V, throttle opening $\Theta$, a turbine speed Nt and a shift gear stage G from the sensors 21–25 (S1). Thereafter, the control unit 20 stores the vehicle speed V and the throttle opening $\Theta$ in predetermined addresses of memory therein (S2, S3, S4 and S5). In these steps S2, S3, S4 and S5, the control unit 20 renews values of the throttle opening $\Theta$ and the vehicle speed V stored in addresses TVO(i) and V(i) respectively in a manner that values obtained through the current cycle are stored in the addresses TVO(i) and V(i) and the values obtained through the preceding cycle and stored in the addresses TVO(i) and V(i) are moved to addresses TVO(i-1) and V(i-1).

Thus, hereinafter, suffixes i and i-1 denote the current cycle and the preceding cycle respectively in referring to the address of the memory.

In next, the control unit 20 calculates an actual quantity of a slippage in the lock-up clutch 7 or a speed difference Ns between the engine speed Ne and the turbine speed Nt(S6). Then the control unit 20 calculates a deviation dN = Ns-No wherein the reference No denotes a target slippage of the lock-up clutch 7 (S7). In step S8, the control unit 20 judges whether or not a present engine operating condition defined by the throttle opening $\Theta$ and the vehicle speed V falls into a slip control zone as shown by a hatched portion in FIG. 3(A) wherein the control unit carries out a slip control in which the engaging force of the lock-up clutch 7 is controlled to allow the lock-up clutch 7 to produce a certain amount of slippage or a speed difference between the engine speed Ne and the turbine speed Nt.

In the illustrated embodiment, the slip control zone is defined as an area wherein the throttle opening Θ is not more than 2/8, the vehicle speed V is between 20–50km/H. Meanwhile, the slip control is turned OFF or released when the engine operating condition is outside of an area defined by a broken line in FIG. 3(A). Thus, in the illustrated embodiment, the slip control ON line shown by the real line differs from the slip control OFF line shown by the broken line for preventing a hunting of the control.

Figure 3A:
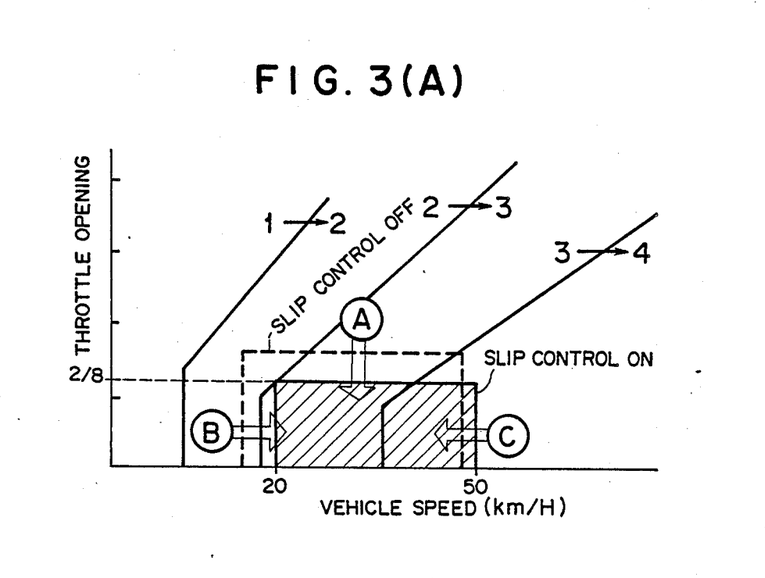
FIG. 3(A) is a graphical representation showing a slip control zone.

The control unit 20 judges if the engine operating condition is in the slip control zone in light of the map as shown in FIG. 3(A) in the step S8. When the judgment is NO, the control unit 20 sets a slip control flag Fs at a value of Fs=0 which means that the current vehicle operating condition is out of the slip control zone (S9). Then, the control unit 20 moves a value of the deviation dN stored in an address for the current value to an address for the preceding value dN'(S10). In step S11, the control unit 20 judges whether or not the present vehicle operating condition is in a lock-up control zone wherein the lock-up clutch is fully engaged not to allow a slippage thereof. When the judgment is YES, the control unit 20 provides a converter control flag Fc with a value of Fc=0 which means that the lock-up control will be carried out. For this purpose, the control unit 20 sets the duty ratio D of the duty solenoid valve 19 at the maximum value Dmax so that the lock-up clutch 7 is fully engaged (S13).

When the judgment in step S11 is NO or the vehicle operating condition is in a converter control zone in which the lock-up clutch 7 is fully disengaged so that all the engine toque transmitted through the toque converter 1, the control unit 20 sets the flag Fc at a value of Fc=1 (S14) and provides the duty ratio D with the minimum value Dmin (S15).

In any case, the control unit 20 thereafter produces a control signal to the duty solenoid valve 19 (S16).

Thus, in the case where the vehicle operating condition is in the lock-up control zone, the pilot pressure acting on the spool 10a is minimized so that the lock-up releasing pressure introduced into the chamber 12 is minimized resulting in a full engagement of the lock-up clutch 7. On the other hand, in the converter control zone, the pilot pressure is maximized because of the minimum duty ratio Dmin so that the lock-up clutch 7 is fully disengaged.

When the vehicle operating condition is in the slip control zone, the control unit 20 judges the value of the slip control flag Fs (S17). The value of the flag Fs=1 means that the vehicle operating condition was in the slip control condition at the time of the preceding cycle of this program. In this case, the control unit 20 calculates a feedback control factor U in accordance with the following formula (S18);

$$U = A^* dN + B^* dN' \tag{1}$$

wherein dN' is a deviation between the actual slippage Ns and the target slippage No in the preceding cycle.

Figure 3B:
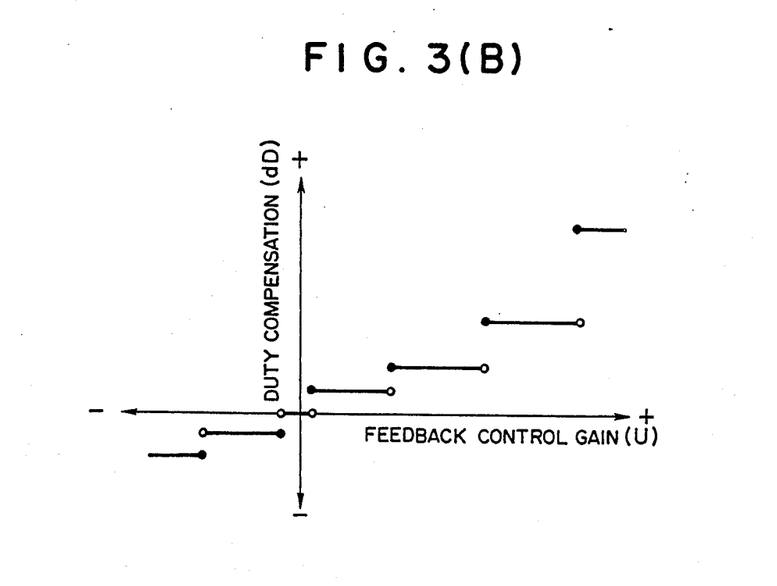
FIG. 3(B) is a graphical representation showing a relationship between a duty ratio compensation and a feedback control gain.

In step S19, the control unit 20 determines a compensation dD corresponding to the value of the feedback control factor U with respect to the duty ratio D based on a map as shown in FIG. 3(B). The control unit 20 obtains the current value D of the duty ratio by modifying the precedent value D' of the duty ratio with the compensation dD wherein D is provided by D=D'+dD. Then the control unit 20 carries out steps 20 and 21 to provide the flag Fs with the value Fs=1 and renew the value of the deviation dN' by moving a value stored in an address for the current cycle to an address for the preceding cycle. Then, the control unit 20 produces a control signal to the duty solenoid valve 19 so as to reach the duty ratio D.

With this slip control, when both the deviations of dN, and dN' of the current and the preceding cycle respectively take negative values or the actual slippage Ns is smaller than the target slippage No, the feedback control factor U and the compensation dD take also negative values so that the duty ratio D for the duty solenoid valve 19 is reduced to decrease the drain resulting in an increase of the pilot pressure for the lock-up control valve 10. As a result, the engaging force of the lock-up clutch 7 is controlled to increase the actual slippage Ns.

To the contrary, When both the deviations dN and dN' take positive values or the actual slippage Ns is greater than the target value No, the duty ratio D is increased to reduce the pilot pressure of the lock-up control valve 10 so that the engaging force of the lock-up clutch 7 is controlled to reduce the slippage Ns toward the target value No.

Meanwhile, when the sign of the deviation dN in the current cycle is different from that of the deviation dN' in the preceding cycle, this means that the actual slippage Ns is maintained at a value close to the target value No. Thus, the compensation dD is also set at a small value.

In the step S8, where the vehicle operating condition is judged to be in the slip control condition when the slip control flag Fs is a value of Fs=0, this means that the vehicle operating condition is transferred from the converter control zone or the lock-up control zone to the slip control zone in the current processing cycle. In this case, the control unit 20 judges the value of the converter flag Fc. When the flag Fc is a value of Fc=0 which means that the vehicle operating condition is changed from the lock-up control condition to the slip control condition, the control unit 20 carries out the feedback control of the slippage Ns in accordance With the procedures from steps 17–21 and step 16 as aforementioned.

When the flag Fc is a value of Fc=1 which means that the vehicle operating condition is changed from the converter control condition to the slip control condition, the control unit 20 carries out a transient control in accordance with a vehicle operating condition just before the change from the converter control condition to the slip control condition for a predetermined time period before the feedback control of the slippage Ns as mentioned above in connection with the steps 17–21 and step 16.

This transient control is made in accordance with steps S23–S28 of FIG. 2.

The control unit 20 judges a value of a transient flag Fd (S22). At the time when the vehicle operating condition is changed to be in the slip control zone, the flag Fd is a value of Fd=0 which means that the transient control is not initiated. Thus, the judgment in step S22 is NO. In this case, the control unit 20 determines an initial value of the duty ratio D (S24).

Figure 4:
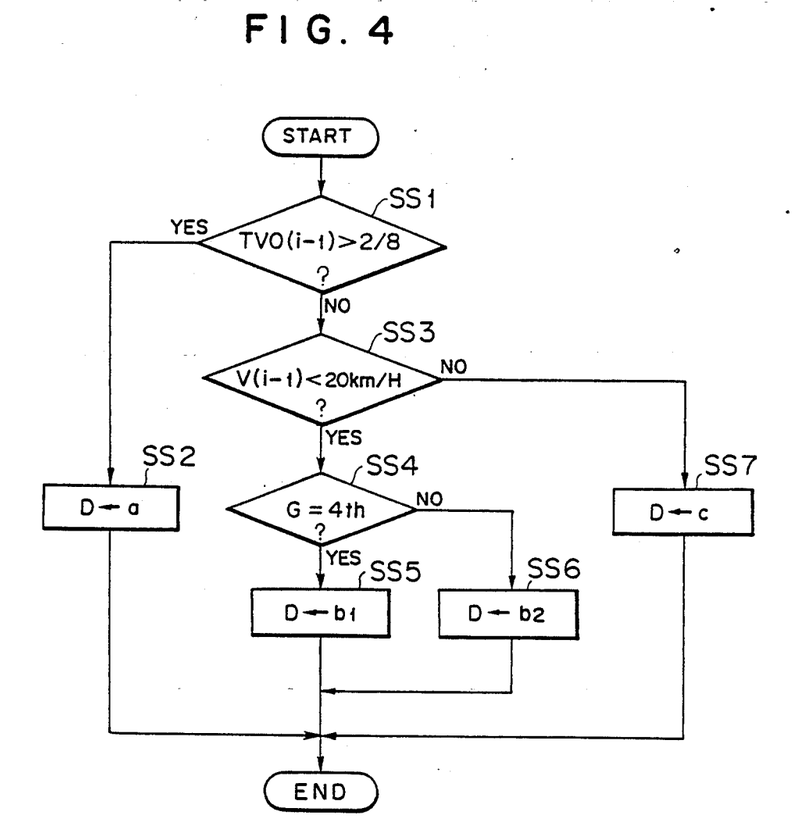
FIG. 4 is a flow chart of a program of a slip control in accordance with an embodiment of the present invention.

In determining the initial value of the duty ratio D, the control unit 20 carries out a subroutine program as shown in FIG. 4 by a flow chart. The control unit 20 carries out different transient controls in accordance with the vehicle operating condition just before it falls into the slip control zone. In FIG. 4, the control unit 20 judges whether or not the value of the throttle opening Θ in the preceding cycle stored in the address TVO(i-1) is greater than 2/8 in order to identify the vehicle operating condition just before a zone change occurred from the converter control zone to the slip control zone (SS1). If this judgment is YES, it is found that the throttle opening Θ is reduced to bring the vehicle operating condition into the slip control zone from the converter control zone. This transient condition is shown in FIG. 3(A) by an arrow A and causes a relatively hard torque shock. Therefore, the control unit 20 provides the initial value of the duty ratio D with a relatively small one a (10% in this embodiment) to suppress the torque shock (SS2).

In step SS1, when the judgment is NO, the control unit 20 judges whether or not a value of the vehicle speed V in the preceding cycle stored in the address V(i-1) is smaller than 20km/H (SS3). If this judgment is YES, it is found that the vehicle speed V is increased to lead the vehicle operating condition to the slip control zone. This change is shown by an arrow B in FIG. 3(A). According to the control of the illustrated embodiment, the initial value of the duty ratio in the transient control is determined in accordance with the shift gear stage selected taking into account that the torque shock is increased as the gear stage is changed to a higher stage. For this purpose, the control unit 20 further judges whether or not the gear stage of the transmission is positioned at a highest gear stage (4th stage in this embodiment)(SS4).

If the judgment is YES or the gear stage is in the highest one, the control unit 20 provides the initial value with a duty ratio b1 (15% in this embodiment)(SS5). When the judgment is NO, the control unit 20 provides the initial value with a duty ratio b2 (17% in this embodiment)(SS6).

In the case where the Judgment in step SS3 is NO, since it is already confirmed from the judgment of step S8 in FIG. 2 that the current vehicle operating condition is in the slip control condition, it is found that the vehicle operating condition fell into the slip control zone as a result of a reduction of the vehicle speed V below 50km/H. This transient condition corresponds to a condition as shown by an arrow C in FIG. 3(A).

In this case, the torque shock is not harder than that of the above two cases of the arrows A and B so that the control unit 20 provide the initial value of the duty ratio D with the largest one c(20% in this embodiment) among the three cases shown by the arrows A, B, and C (SS7).

After setting the initial values of the duty ratios D in accordance with the respective vehicle operating conditions at the time of initiation of the slip control, the control unit 20 sets the transient flag Fd with a value of Fd=1(S25, and produces a control signal of a duty ratio in accordance with the initial value obtained through the above procedure to the duty solenoid valve 19(S16).

Thereafter, the control unit 20 carries out the transient control as a feedforward control in accordance with steps S26, S27 and S28 in FIG. 2.

In step S26, the control unit 20 add an increment dDo (5%/sec) to the duty ratio D in every proceeding cycle of the program until the value of the duty ratio D reaches a predetermined value DA (50%). In the first proceeding cycle after the transient control is initiated, the duty ratio D is provided by a value in which the increment dDo is added to the initial value. The control unit 20 produces a control signal to the duty solenoid valve 19 in accordance with a value of the duty ratio D which is increased during the transient control by the increment dDo in every proceeding cycle.

Through this transient control, the slippage of the lock-up clutch 7 is gradually reduced toward the target value No.

When the duty ratio D reaches the predetermined value DA, the control unit 20 finishes the transient control to provides the transient flag Fd with the value of Fd=0 and sets the slip control flag Fs at the value of Fs=1 to initiate the slip control as the feedback control for the slippage No (S20).

Figure 5:
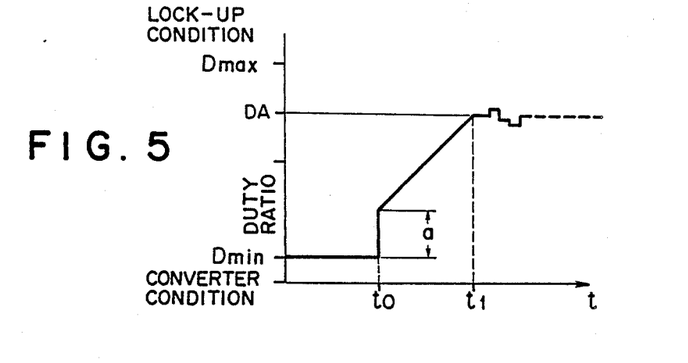
FIGS. 5, 6 and 7 are graphical representations showing changes of duty ratio during a transient control.

In the transient control, when the vehicle operating condition is transferred into the slip control zone through the condition as shown by the arrow A in FIG. 3(A), the duty ratio D is changed as shown in FIG. 5 during the transient control. Under this control, a time period timing t0 to t1 in this embodiment) of the transient control is relatively long because the initial value a of the duty ratio is relatively small.

Figure 7:
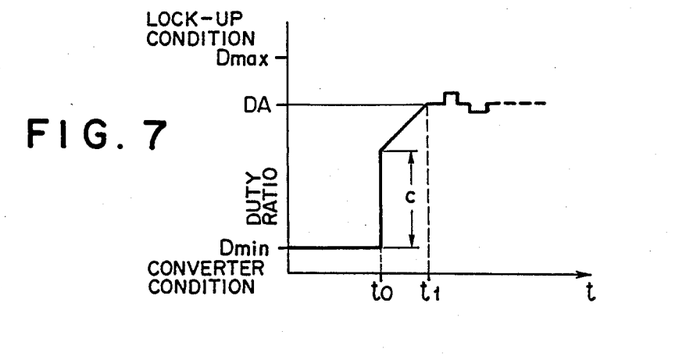

Alternatively, in the case of the arrow B in FIG. 3(A), since different initial values b1 and b2 are set in accordance with the gear stage currently selected, the duty ratio D are changed as shown by lines 11 and 12 respectively. Thus, the time period is changed in accordance with the gear stage selected at the beginning of the slip control. When the transient control is made in the case of the arrow C, the time period between the timing t0 and t1 of the control is further shortened because of the larger initial value c as shown in FIG. 7.

Hereinafter, there is described another embodiment of the present invention in accordance with FIGS. 8-11.

In this transient control, a same initial value d0 but different increments α, β1, β2 and Γ are provided for the respective cases corresponding to the arrows A, B and C in FIG. 3(A).

Figure 8:
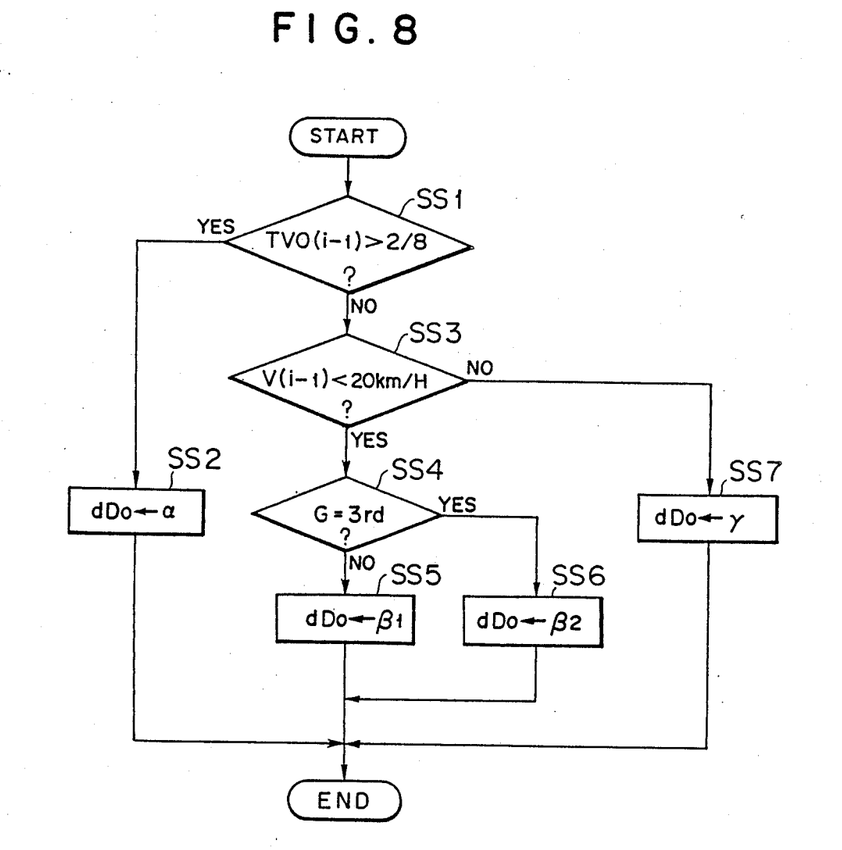
FIG. 8 is a flow chart of a program of a slip control but showing another embodiment in accordance with the present invention.
Figure 9:
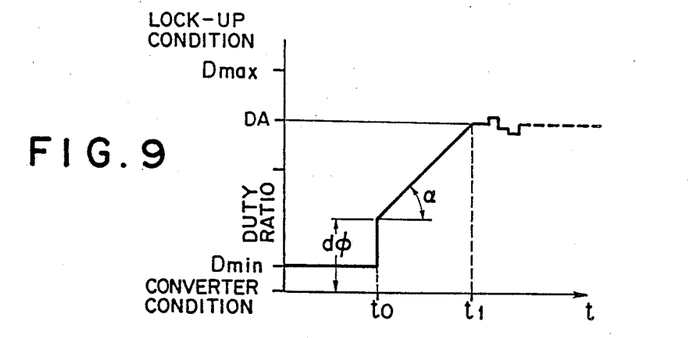
FIGS. 9, 10 and 11 are graphical representations similar to the FIGS. 5, 6 and 7 but showing the embodiment of FIG. 8.

According to this embodiment, when the transient control is initiated because of the decrease of the throttle opening Θ (as shown by the arrow A in FIG. 3(A)), namely when the judgment in step SS1 is YES in FIG. 8, the control unit provides a relatively small value of the increment o with a value of 4%/sec in this embodiment SS2. Thus, the duty ratio D is changed during the transient control from the value of dO to DA as shown in FIG. 9 and the time period of the transient control is relatively long. When the judgment of the step SS1 is NO, the control unit 20 judges the vehicle speed V in step SS3 as well as the former embodiment.

Figure 10:
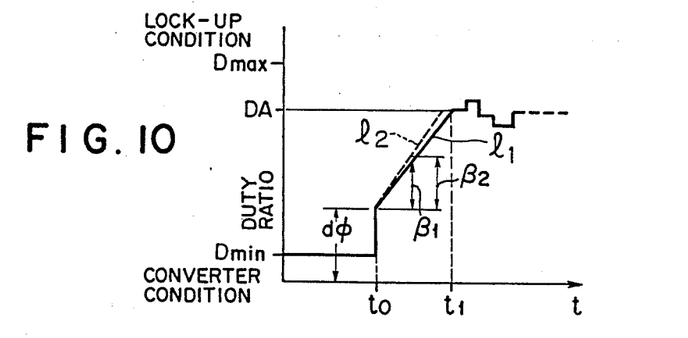

If this judgment is YES which means that the vehicle operating condition fell into the slip control zone because of the increase of the vehicle speed V as shown by the arrow B in FIG. 3(A), the control unit 20 set the increments at values of β1=6%/sec and β2=8%/sec respectively in accordance with the gear stages selected. Therefore, the duty ratios D are changed along lines 11 and 12 respectively as shown in FIG. 10.

Figure 11:
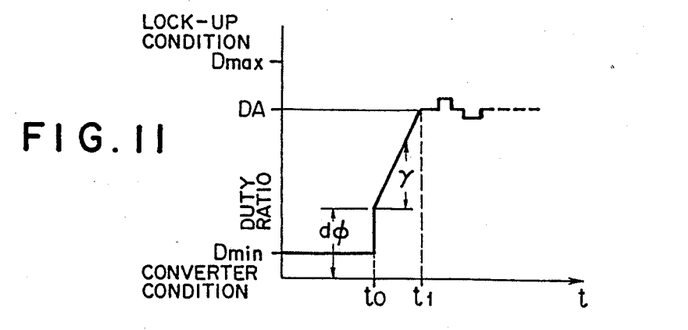

In the case where the Judgment in step SS3 is NO, that is in the case where the vehicle operating condition fell into the slip control zone as a result of a reduction of the vehicle speed V below 50km/H, which corresponds to a condition as shown by an arrow C, the control unit 20 provides the increment of the duty ratio D with a largest one Γ (10%/sec in this embodiment) among the three cases shown by the arrows A, B, and C (SS7). In this case, the duty ratio D is changed as shown in FIG. 11 with a relatively short transient control period.

The transient control can be made in accordance with a feedback control from the timing of t0 in such a manner that the target value of the slippage is modified gradually toward the final target value No during the transient control.

Figure 12:
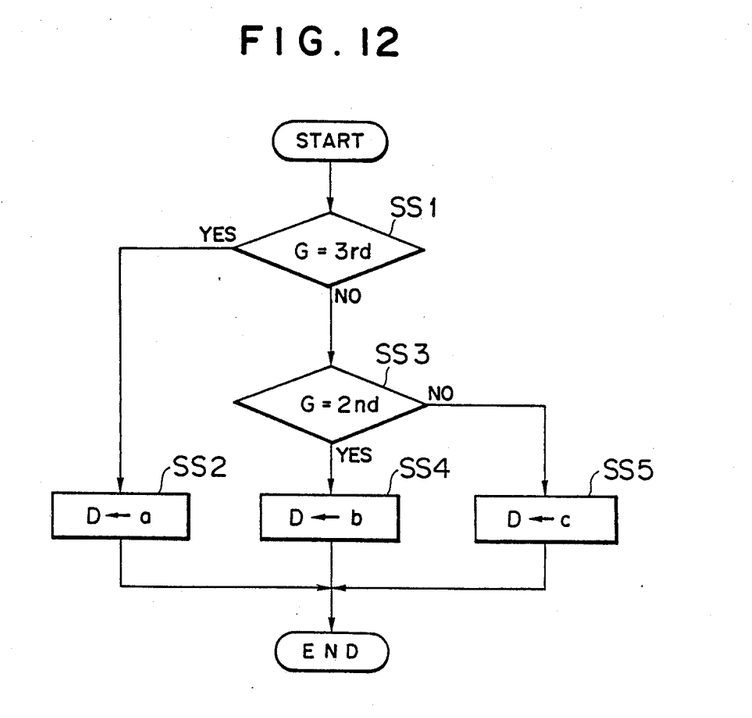
FIG. 12 is a flow chart as well as FIG. 8 but showing still further embodiment of the present invention.

Hereinafter, there is described further embodiment of the present invention taking reference with FIG. 12.

As shown in FIG. 3(A), the changes in the vehicle operating condition for the slip control as shown by the arrows B, A and C generally correspond to the gear stages 2nd, 3rd and 4th respectively. In other words, the slip control corresponding to the arrow B is initiated mostly when the 3rd gear stage is selected. Likewise, the slip controls corresponding to the arrows A and C are mostly initiated when the 2nd and 4th gear stages are selected respectively.

In view of the above, in the illustrated transient control, the control unit 20 provides the duty ratio with a initial value in accordance with the gear stages selected at the time when the vehicle operating condition is transferred to a slip control zone.

For this purpose, the control unit 20 judges whether or not the gear stage selected is 3rd in step SS1 just before the vehicle operating condition is transferred to the slip control zone. If this judgment is YES, it is found that the vehicle operating condition was changed into the slip control zone through the condition of the arrow A in FIG. 3(A). Therefore, the control unit 20 provides the duty ratio D with the initial value 5.

Figure 6:
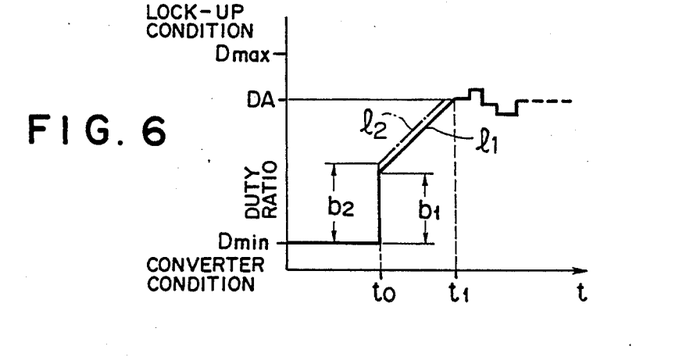

If the judgment of step SS1 is NO, the control unit 20 further judges whether or not the gear stage selected is not higher than 2nd at the time just before the vehicle operating condition fell into the slip control zone(SS3). When the judgment is YES, it is found that the slip control condition is established through the condition of the arrow B. Therefore, the control unit 20 provides the duty ratio D with the initial value b shown in FIG. 6 (SS4). If the judgment is NO in step SS3, the control unit 20 provides the duty ratio with the initial value c shown in FIG. 7 (SS5).

According to the present invention, control factors for the transient control such as initial value of the duty ratio, the increment of the duty ratio and the like are changed in accordance with the vehicle operating condition just before the slip control is initiated. Thus, according to the present invention, the torque shock induced by a change between non-slip control to the slip control is suppressed effectively. Besides, the transient control can be completed promptly.

It will be apparent from that many modifications and variations may be made based on the above descriptions by those skilled in the art without departing from the scope of the claims as attached.

I claim:

1. A slip control system of a lock-up clutch of an automatic transmission comprising a torque converter disposed between the engine and the automatic transmission for controlling an amount of a torque transmitted from the engine to the transmission, lock-up clutch means provided in the torque converter for connecting input and output members of the torque converter directly, slip control means for controlling an engaging force of the lock-up clutch means to establish a slip control in which a slippage is allowed between the input member and output member when a vehicle operating condition is in a predetermined slip control zone, transient control means for carrying out a transient control by setting a transient control factor to increase a change in the engaging force of the lock-up clutch means during a transient condition when the vehicle operating condition is changed between a non-slip control zone wherein the lock-up clutch is fully engaged or fully disengaged and said slip control zone, and the transient control factor being determined in accordance with the vehicle operating condition just before the vehicle operating condition falls into said slip control zone.

2. A slip control system in accordance with claim 1 wherein the transient control factor for increasing the change in the engaging force of the lock-up clutch is determined at a value smaller than that in a case where an engine load is reduced to initiate the slip control when a vehicle speed is increased to initiate the slip control as a change in the vehicle operating condition.

3. A slip control system in accordance with claim 1 wherein the transient control factor is determined at a value smaller than that in the case where an engine load is reduced to initiate the slip control when a vehicle speed is reduced to initiate the slip control as a change in the vehicle operating condition.

4. A slip control system in accordance with claim 1 wherein the transient control factor is determined at a value smaller than that in the case where a vehicle speed is increased to initiate the slip control when the vehicle speed is reduced to initiate the slip control as a change in the vehicle operating condition.

5. A slip control system in accordance with claim 1 wherein the transient control factor is determined at a value greater than that in the case where a vehicle speed is reduced to initiate the slip control and smaller than that in the case where an engine load is reduced to initiate the slip control when the vehicle speed is increased to initiate the slip control as a change in the vehicle operating condition.

6. A slip control system in accordance with claim 1 wherein a transition of the vehicle operating condition from the non-slip control zone to the slip control zone is detected based on a change in a vehicle speed or a throttle valve opening.

7. A slip control system in accordance with claim 1 wherein the transient control factor is employed for either a feedback control or a feedforward control of the engaging force of the lock-up clutch means, an initial value of the transient control factor being determined in accordance with the vehicle operating condition just before the vehicle operating condition falls into the slip control zone.

8. A slip control system in accordance with claim 1 wherein the transient control factor is employed for either a feedback control or a feedforward control of the engaging force of the lock-up clutch means, a change rate of the transient control factor being determined in accordance with the vehicle operating condition just before the vehicle operating condition falls into the slip control zone.

9. A slip control system in accordance with claim 1 wherein the transient control factor is employed for either a feedback control or a feedforward control of the engaging force of the lock-up clutch means, a predetermined time period of the transient control being determined in accordance with the vehicle operating condition just before the vehicle operating condition falls into the slip control zone.

10. A slip control system in accordance with claim 1 wherein the transient control is carried out until the transient control factor reaches a target value by means of a feedforward control of the engaging force of the lock-up clutch means in a manner that the engaging force is gradually changed.

11. A slip control system in accordance with claim 7 or 9 wherein the transient control is changed in accordance with a shift gear stage of the transmission which is selected at the time when the vehicle operating condition is transferred from the non-slip control condition to the slip control condition.

12. A slip control system in accordance with claim 1 wherein the transient control is changed in accordance with a shift gear stage of the transmission which is selected at the time when the vehicle operating condition is transferred from the non-slip control condition to the slip control condition.

13. A slip control system in accordance with claim 1 wherein the transient control is carried out by means of a feedforward control in which the engaging force of the lock-up clutch means is changed in accordance with a predetermined control property, a feedback control being initiated after a completion of the transient control in a manner that the engaging force of the lock-up clutch means is controlled to allow the predetermined speed difference between the input and output members of the torque converter.

* * * * *